United States Patent [19]
Ashley

[11] Patent Number: 4,979,171
[45] Date of Patent: Dec. 18, 1990

[54] ANNOUNCEMENT AND TONE CODE GENERATOR FOR TELEPHONIC NETWORK AND METHOD

[75] Inventor: James P. Ashley, Downers Grove, Ill.

[73] Assignee: Rockwell International Corporation, El Segundo, Calif.

[21] Appl. No.: 347,293

[22] Filed: May 3, 1989

[51] Int. Cl.⁵ .............................. H04J 3/00; H04J 3/12
[52] U.S. Cl. ..................................... 370/110.2; 379/88
[58] Field of Search ............... 370/110.2, 110.3, 110.1; 379/88

[56] References Cited

U.S. PATENT DOCUMENTS

| | | | |
|---|---|---|---|
| 4,205,203 | 5/1980 | Metha et al. | 370/110.2 |
| 4,558,181 | 12/1985 | Blanchard et al. | 379/88 |
| 4,644,476 | 2/1987 | Bergeron | 379/361 |
| 4,720,848 | 1/1988 | Akiyama | 379/88 |
| 4,782,510 | 11/1988 | Szlam | 379/88 |

Primary Examiner—Douglas W. Olms
Assistant Examiner—Min Jung
Attorney, Agent, or Firm—C. B. Patti; V. L. Sewell; H. F. Hamann

[57] ABSTRACT

An announcement and tone generator (10) for use with a telephonic network stores binarily encoded tone samples in a nonvolatile memory (22), such as a PROM or ROM, so that tones are immune to loss of memory due to power loss and, stores the binarily encoded announcements in a volatile memory, such as a DRAM, which is protected against memory loss by means of a back-up battery circuit. A microprocessor (20) provides successive samples of preselected binarily encoded tones or announcements for each of a plurality of time division multiplex channels which are coupled to the telephone network (12) through a digital interface (18).

16 Claims, 14 Drawing Sheets

RECORD (RCVB = 0)

SIGNALLED PLAYBACK (RCVB = 0)

LOOP PLAYBACK (RCVB = 0)

Fig.4A

| NO. | STRAPPING | TONE DESCRIPTION | FREQ (Hz) | LEWEL/FREQ (dBm0) | ON/OFF (Sec) |
|---|---|---|---|---|---|
| 1 | 00000 | Quiet | - | - | (Constant) |
| 2 | 00001 | High Tone | 480 | -17 | (Constant) |
| 3 | 00010 | Low Tone | 480+620 | -24 | (Constant) |
| 4 | 00011 | Dial Tone | 350+440 | -19 | (Constant) |
| 5 | 00100 | Ringback | 440+480 | -19 | 2/4 |
| 6 | 00101 | Steady Ringback | 440+480 | -19 | (Constant) |
| 7 | 00110 | Busy | 480+620 | -24 | 0.5/0.5 |
| 8 | 00111 | Reorder | 480+620 | -24 | 0.25/0.25 |
| 9 | 01000 | Monitor Warning | 1400 | -24 | (Constant) |
| 10 | 01001 | Pseudo Milliwatt | 1004 | 0 | (Constant) |
| 11 | 01010 | Test tone | 1004 | -16 | (Constant) |
| 12 | 01011 | Position Alignment | 1004 | -21 | (Constant) |
| 13 | 01100 | Echo Suppressor | 2150 | -10 | (Constant) |
| 14 | 01101 | DTMF Sender * | | -7 | 0.05/0.05 |
| 15 | 01110 | MF Sender * | | -7 | 0.07/0.07 |
| 16 | 01111 | Canadian Ringback | 440+480 | -19 | 1/3 |

Fig.4B

| NO. | STRAPPING | MAXIMUM LENGTH (approx sec) | TYPE PLAYBACK (loop/signalled) |
|---|---|---|---|
| 17 | 10000 | (Quiet) | - |
| 18 | 10001 | (Quiet) | - |
| 19 | 10010 | 2 | loop |
| 20 | 10011 | 2 | signalled |
| 21 | 10100 | 8 | loop |
| 22 | 10101 | 8 | signalled |
| 23 | 10110 | 16 | loop |
| 24 | 10111 | 16 | signalled |
| 25 | 11000 | 33 | loop |
| 26 | 11001 | 33 | signalled |
| 27 | 11010 | 33 to 262 | loop |
| 28 | 11011 | 33 to 262 | signalled |
| 29 | 11100 | (Spare) | |
| 30 | 11101 | (Spare) | |
| 31 | 11110 | (Spare) | |
| 32 | 11111 | (Spare) | |

Fig.4C

| DIGIT | FUNCTION | (b7----b0) | (OCTAL) | DTMF SIGNAL FREQUENCIES (Hz) |
|---|---|---|---|---|
| 1 | Dial Digit | 00000001 | 01 | 697 + 1209 |
| 2 | Dial Digit | 00000010 | 02 | 697 + 1336 |
| 3 | Dial Digit | 00000011 | 03 | 697 + 1477 |
| 4 | Dial Digit | 00000100 | 04 | 770 + 1209 |
| 5 | Dial Digit | 00000101 | 05 | 770 + 1336 |
| 6 | Dial Digit | 00000110 | 06 | 770 + 1477 |
| 7 | Dial Digit | 00000111 | 07 | 852 + 1209 |
| 8 | Dial Digit | 00001000 | 10 | 852 + 1336 |
| 9 | Dial Digit | 00001001 | 11 | 852 + 1477 |
| * | Dial Digit | 00001010 | 12 | 941 + 1209 |
| 0 | Dial Digit | 00001100 | 14 | 941 + 1336 |
| # | Dial Digit | 00001011 | 13 | 941 + 1477 |
| A | (spare) | 00001101 | 15 | 697 + 1633 |
| B | (spare) | 00001110 | 16 | 770 + 1633 |
| C | (spare) | 00001111 | 17 | 852 + 1633 |
| D | (spare) | 00010000 | 20 | 941 + 1633 |

Fig.4D

| DIGIT | FUNCTION | B CHANNEL CHARACTER * (b7----b0) | (OCTAL) | MF SIGNAL FREQUENCIES (Hz) |
|---|---|---|---|---|
| 1 | Dial Digit | 00000001 | 01 | 700 + 900 |
| 2 | Dial Digit | 00000010 | 02 | 700 + 1100 |
| 3 | Dial Digit | 00000011 | 03 | 900 + 1100 |
| 4 | Dial Digit | 00000100 | 04 | 700 + 1300 |
| 5 | Dial Digit | 00000101 | 05 | 900 + 1300 |
| 6 | Dial Digit | 00000110 | 06 | 1100 + 1300 |
| 7 | Dial Digit | 00000111 | 07 | 700 + 1500 |
| 8 | Dial Digit | 00001000 | 10 | 900 + 1500 |
| 9 | Dial Digit | 00001001 | 11 | 1100 + 1500 |
| 0 | Dial Digit | 00001100 | 12 | 1300 + 1500 |
| KP1 | Digit String Begin | 00010000 | 15 | 1100 + 1700 |
| ST | Digit String End | 00010001 | 17 | 1500 + 1700 |
| KP2 | Digit String End | 00010010 | 16 | 1300 + 1700 |
| STP | Digit String End | 00010011 | 14 | 900 + 1700 |
| ST3P | Digit String End | 00010100 | 13 | 700 + 1700 |

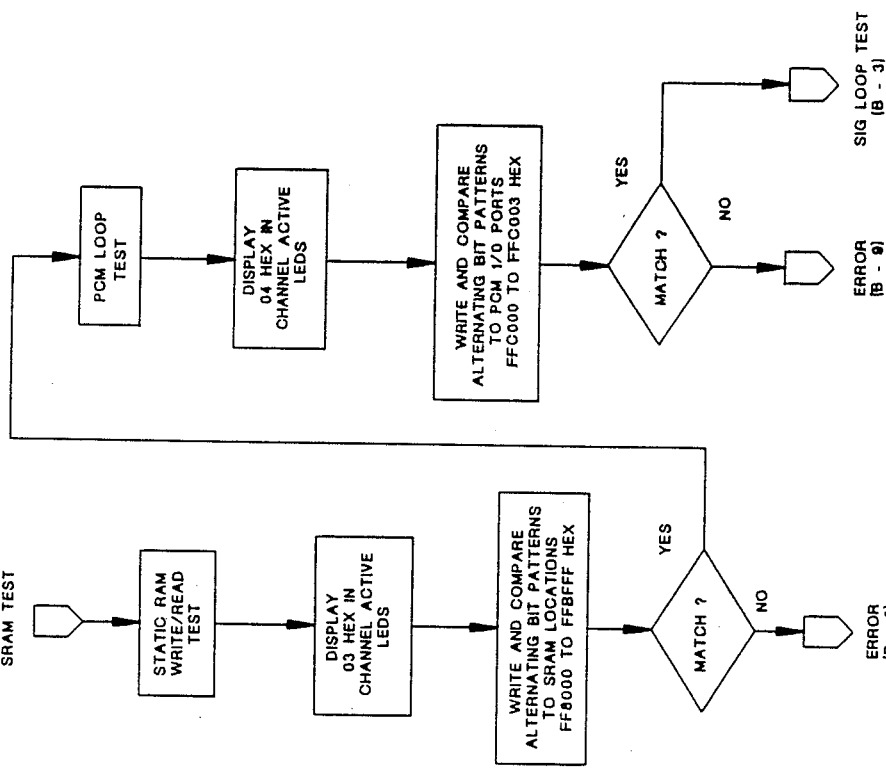
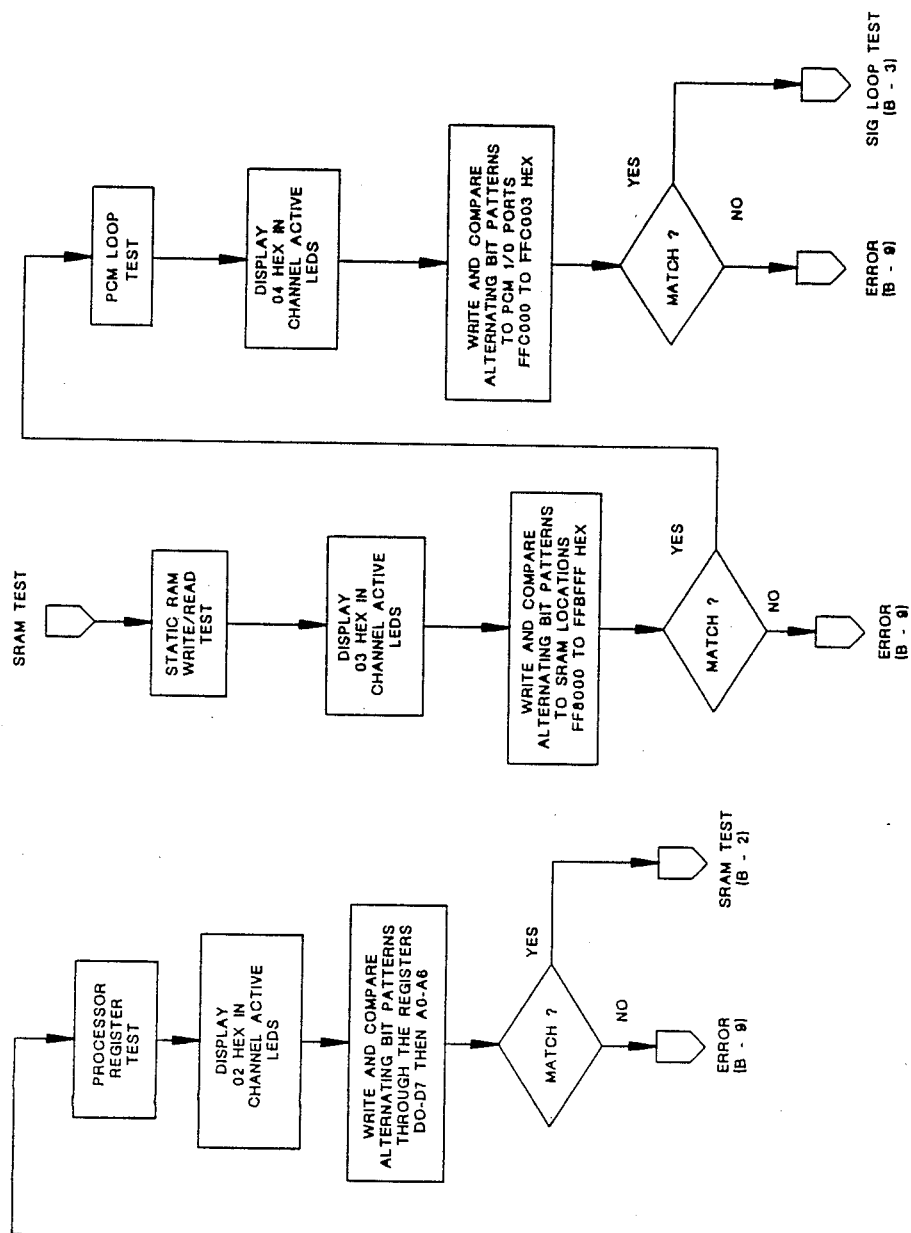
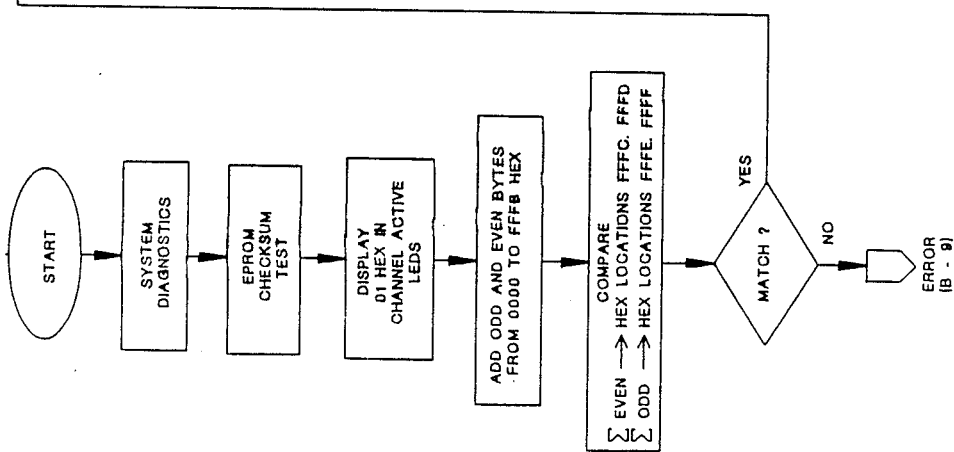
Fig.9A
Fig.9B

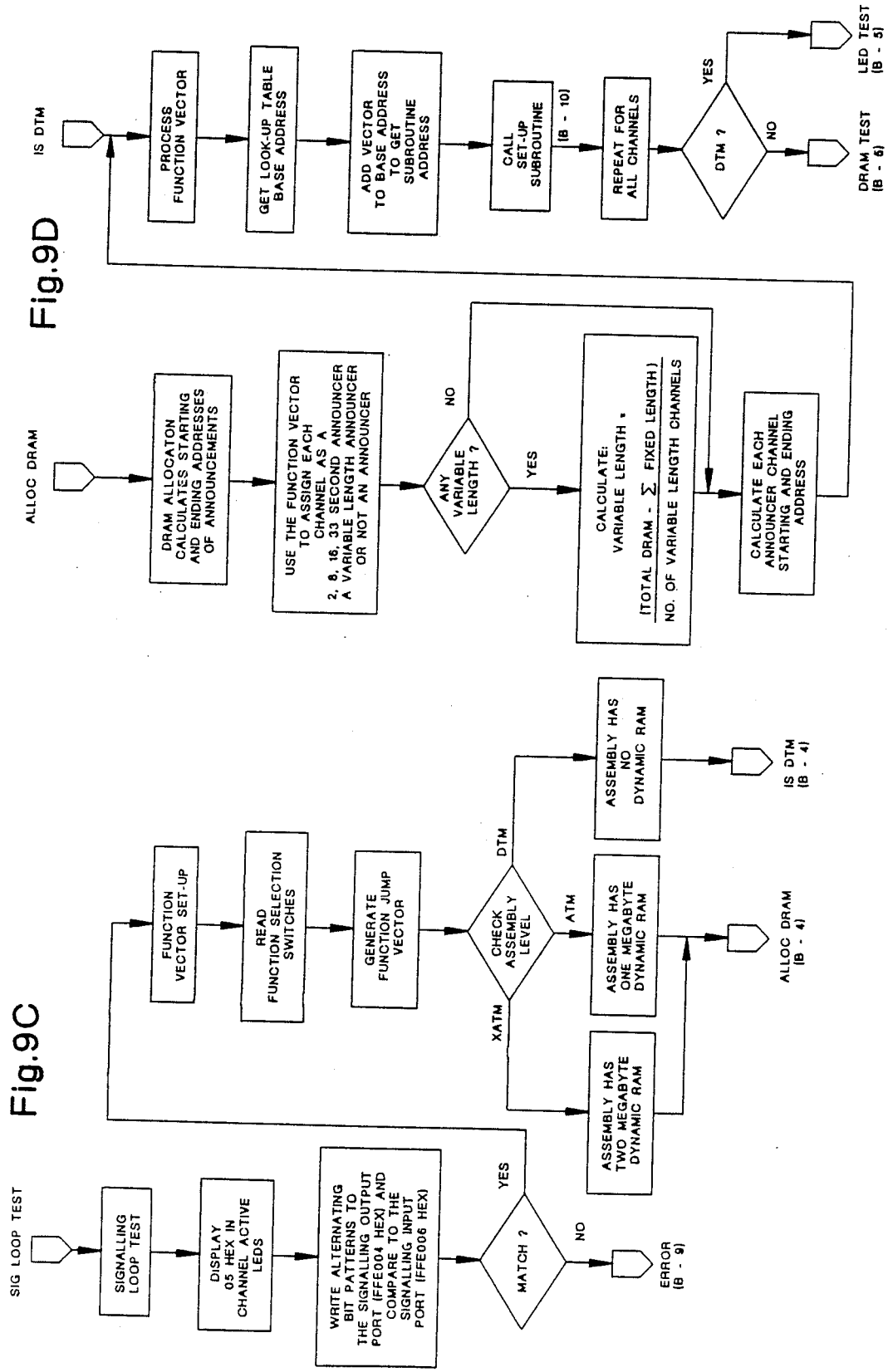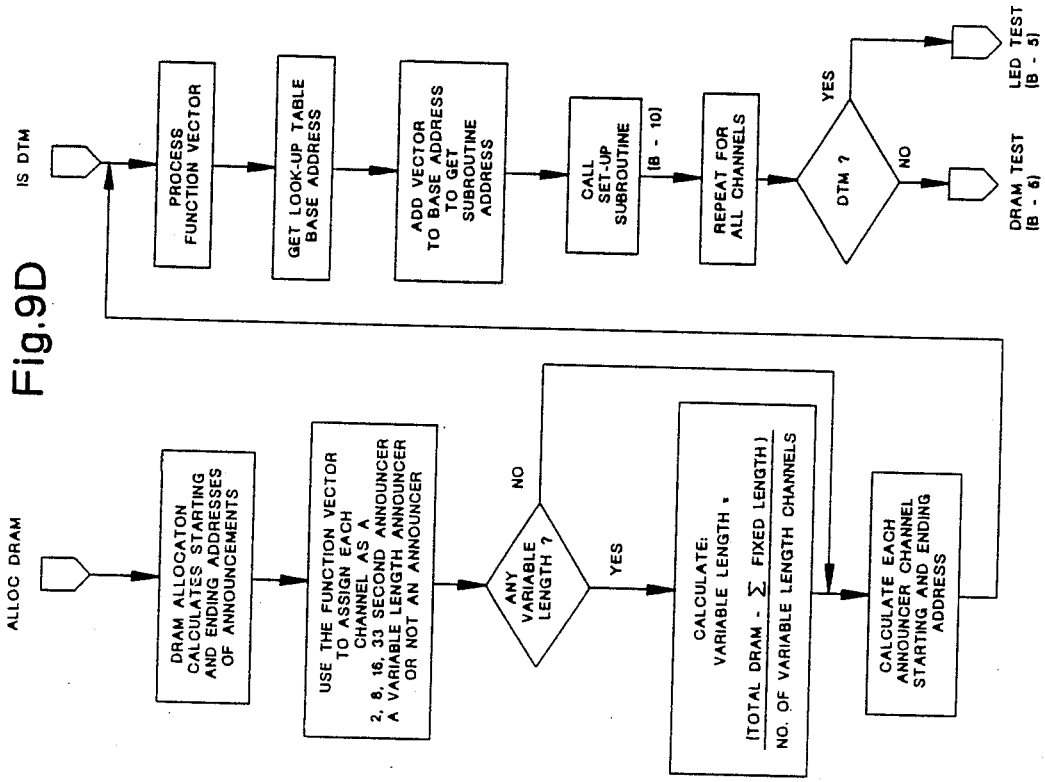
Fig.9D
Fig.9C

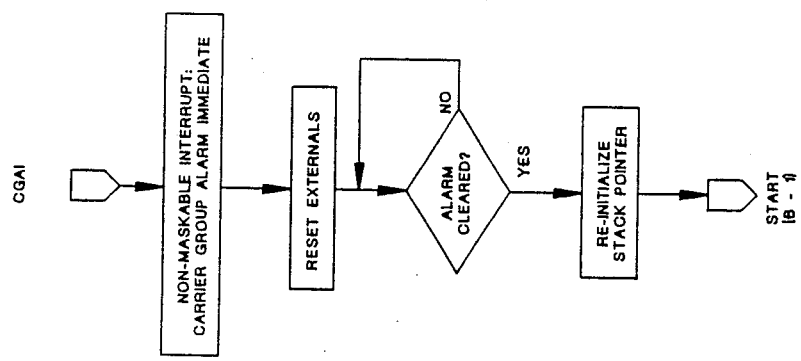
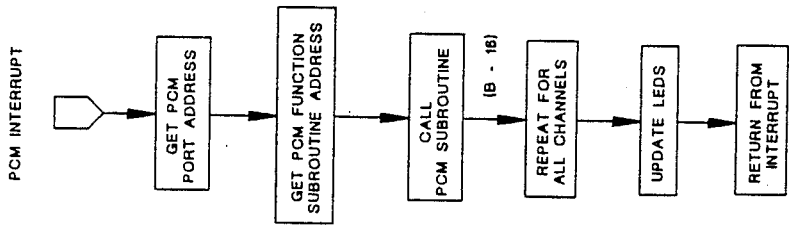
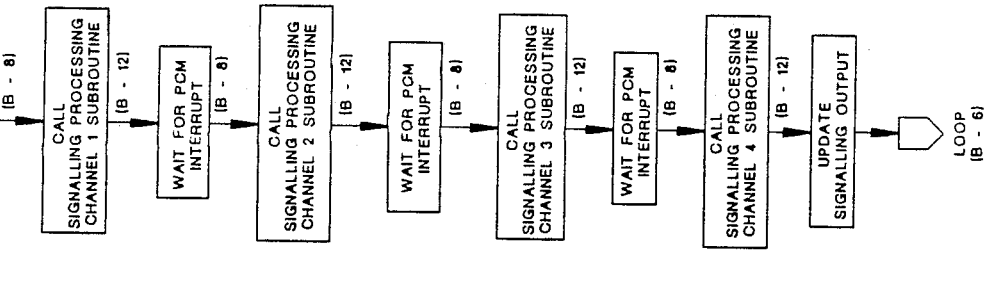
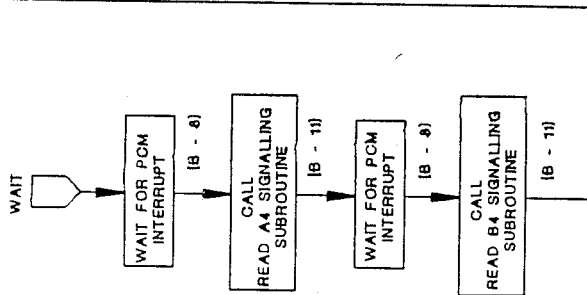

ANNOUNCEMENT AND TONE CODE GENERATOR FOR TELEPHONIC NETWORK AND METHOD

BACKGROUND OF THE INVENTION

This invention relates to apparatus and methods of generating tones and announcements for use with telephone networks and, more particularly, to apparatus and methods of doing so by generating both such tones and announcements in only digital form and on a time division multiplex, multichannel basis.

It is known to store binarily encoded tones and selectively provide them to output ports on a multichannel, time division multiplex basis to a telephone switching network, as shown in U.S. Pat. No. 4,205,203 issued May 27, 1980, to Mehta et al. and owned by the assignee of this application. In such case, different ones of a plurality of tones are digitally signaled selectively in the different time slots of recurring frame cycles. Generally, a group of binarily encoded, or PCM, samples for each tone are stored in addressable memory. As each given time slot recurs, one sample of a tone preselected for that time slot is read out to a common bus As successive cycles occur, the address signals applied to the memory during any given time slot are progressively changed to cause repeated scanning of the samples of the preselected tone. The preselection permits any of the sounds to be placed in any of the time slots, or channels. Such binarily encoded tones are stored in nonvolatile static, read only memories or ROMS. While no means are discussed for storing announcements, the ROM's used to store the codes could also be used to store announcements if the storage capacity were sufficient.

An announcer known as the Cook Electric Model 213300 Single Channel Digital Announcer manufactured by Northern Telecon Inc. is also known which uses only RAM to store only binarily encoded announcements. The announcer is shown and described in the Operators and Maintenance Manual, published 1982, by Northern Telecon Inc., Cook Electric Division. While tones could also be stored in the RAM, the announcer of Cook Electric Division has no means for generating tones; only announcements are generated. There are no ROM's for tone storage; only RAM's are available. In order to protect against loss of binarily encoded announcements stored in RAM, in the Cook Electrical Company announcer, a back-up circuit provides ancillary battery power to the RAM in the event of loss of regular power.

RAM memory is relatively less expensive than ROM memory. The disadvantage of using RAM memory is that it is a volatile memory meaning that storage of information will only last as long as electrical power is applied thereto. In the event of power loss, any binarily encoded tones stored in RAM would be lost and the tone memories must be reloaded off line. Fortunately, in order to store a tone which consists of a repeating pattern, only the smallest segment containing the entire pattern needs to be stored. Accordingly, nonvolatile but more expensive ROM's can be used in place of the less expensive RAM's since only a relatively small amount of memory is required. Announcements, on the other hand, do not comprise rapidly repeating patterns and require much more storage than required for tones.

The problem with the tone generator of the aforementioned Mehta et al. patent, is that only tones can be generated and only expensive ROM's are provided for storage of tones or announcements. While using only ROM's eliminates the need for a back-up circuit to provide ancillary power in the event of power loss, the cost of the ROM's for announcement storage is excessive. Conversely, the disadvantage of the aforementioned Cook Electric Division announcer is that only RAM's are provided for storage of both announcements and tones. Accordingly, even though a back-up battery is provided, should the back-up circuit fail, not only will announcements be lost but also any tones would be lost if stored in RAM in the event of regular power loss.

Another problem with the aforementioned Cook Electric Division announcer is that it only contains a single channel for announcements and interfaces with the telephone network through an analog interface containing expensive A/D converters even though the announcements are stored in digital binarily encoded form. These A/D converters also cause increased distortion, drift and generally degrade the signals which have been stored digitally.

SUMMARY OF THE INVENTION

Accordingly, it is the principal object to overcome the disadvantages of known systems for generating tones or announcements for use with telephone networks by providing a single apparatus which generates both tones and announcements codes on a selective basis and a method which overcomes the disadvantages of known systems and methods.

This object is achieved in part through provision of such an apparatus which comprises a first memory for storing at least one binarily encoded announcement, a second memory for storing at least one binarily encoded tone, a single digital interface for coupling both the binarily encoded announcements and the binarily encoded tones to a telephonic switching system, and a controller including a microprocessor for selectively providing at least one binarily encoded announcement and at least one binarily encoded tone to said single digital interface.

In the preferred embodiment, at least one of the first and second memories is a volatile memory, which only stores said binarily encoded data while electrical power is provided thereto, and the other is a nonvolatile memory. However, a back-up battery circuit is provided for at least said one volatile memory. Thus, the announcement storage is protected to the same extent in the known announcement generator while the tone storage remains independently protected against loss even if the back-up circuit should fail, since it is stored in a nonvolatile memory.

Thus, an objective is also achieved by utilizing a nonvolatile memory for storage of the tones regardless of whether back-up protection is provided for announcement storage.

Advantageously, both the tones and announcements are interfaced to the telephonic network through a single digital interface in binarily encoded form which eliminates the problems caused by analog/digital conversion as well as the need for multiple interfaces. In addition, preferably a single microprocessor controls the selection of both tones and announcement codes for coupling to the interface on a time division multiplex basis.

Multiple channels are available and either tones or announcements can be applied to each channel for enhanced versatility as compared to known systems.

The objective of the invention is also achieved through provision of a method of generating both tones and announcements from digital electronic memories which are protected against memory loss due to loss of regular power, comprising the steps of storing the announcements in a volatile memory protected against memory loss due to loss of regular electrical power by means of a back-up battery circuit, storing the tones in a nonvolatile memory that is not subject to loss of memory due to loss of electrical power, and selectively applying both said stored tones and announcements to a preselected output port on a time dimension multiplexing basis for coupling to different channels of a telephonic network.

BRIEF DESCRIPTION OF THE DRAWINGS

The foregoing objects, features and advantages will be explained in greater detail and other objects, features and advantages will be made apparent from the following detailed description of the preferred embodiment which is given with reference to the several figures of the drawing, in which:

FIGS. 4A, 4B, 4C and 4D are tables showing various tones and announcements preselection codes and descriptions;

DETAILED DESCRIPTION

Figure 1:
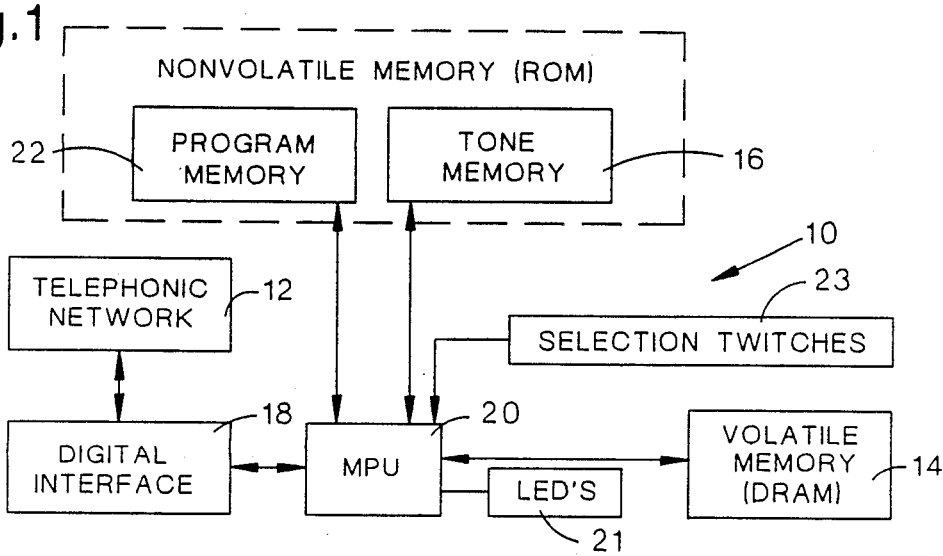
FIG. 1 is a schematic functional block diagram of the announcement and tone code generating apparatus, or generator.
Figure 3B:
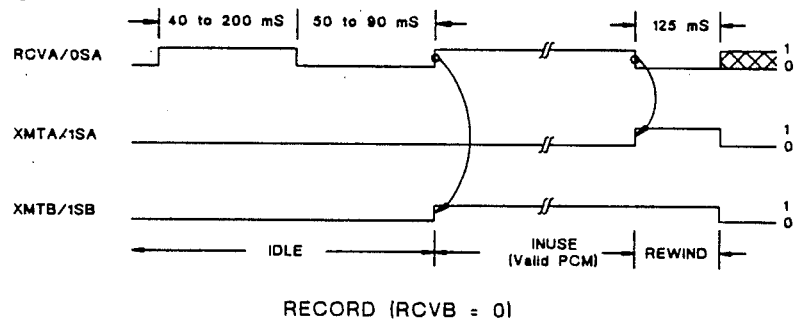
FIGS. 3B, 3C and 3D show the comparative waveforms generated by the circuit of FIG. 2 during the record, signalled playback and loop playback modes of operation.
Figure 3C:
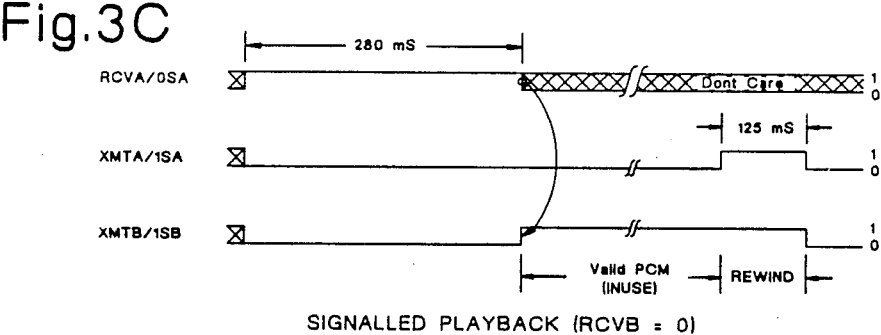
Figure 3D:
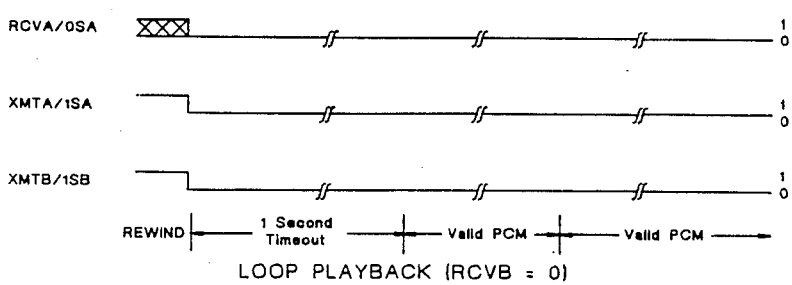

Referring now to FIG. 1, the preferred embodiment of the announcement and tone code generating apparatus, or generator 10 of the present invention is seen as interconnected to a telephonic network 12. The announcement and tone generator 10 includes a volatile memory 14 for storing relatively lengthy announcement codes, a nonvolatile memory, or tone memory, 16 for storing tone sample codes, a digital interface 18 for connecting the announcement codes and the tone codes to the telephonic network 12 in digital, binarily pulse encoded form and a microprocessor unit, or MPU, 20. A set of LED's 21 provide various status indication as will be described below.

The MPU 20 selects successive samples of tone codes from the tone memory 16 and selects successive samples of announcement codes and provides them to the digital interface 18 during selected channels, or time slots, of a T1 time division multiplexed signal A demultiplexer and a decoder within the telephonic network 12 converts the succession of samples of tone codes and announcement code into audible sound which can be heard through means of a telephone receiver or speaker.

The selection of which code samples are generated during which channels and under which conditions is determined by the MPU 20 in accordance with a computer program which is stored in a program memory 22 and the status of program selection, or selection, switches 23. The program memory 22 and the tone memory 16 preferably comprises different parts of a single nonvolatile memory 22' formed of read only memories, ROM's, or programmable read only memories, PROM's. The flow chart for this program is illustrated in FIGS. 9A through 9Q; the listing of computer steps to implement this program is attached hereto as Appendix A, and reference should be made to these elements for a detailed description of all the functions performed.

Briefly, the announcement and tone code generator 10 provides four channels of digitally encoded announcements and codes for interface with a standard T1 signalling port. The tones encoded, such as a so-called "dial tone", for instance, may be progress tones, test tones, dual tone multifrequency, DTMF, and other multifrequency, or MF, tones. The announcement may be any one of a plurality of preselected vocal announcements, such as "We cannot complete your call at this time."

Preferably, each channel is preselectively dedicated to one of up to 32 different functions, i.e. tones or announcements. There are up to twenty-two different tones and ten different announcements from which to select. The announcements can be from two seconds up to 33 to 262 seconds, while the tones may also be of different durations or for indefinite duration depending upon circumstances. The dedication of one function or the other to a particular channel is preferably achieved by means of providing a binary code to the MPU which represents the particular selection by means of strapping the appropriate one of code inputs to logic -1 or logic -0 states by means of selection switches 23. The tone functions, announcer function options, the dual tone multifrequency, or DTMF, sender signalling codes and the multifrequency, or MF, sender signalling codes are shown in the tables of FIGS. 4A, 4B, 4C and 4D, respectively.

Figure 2:
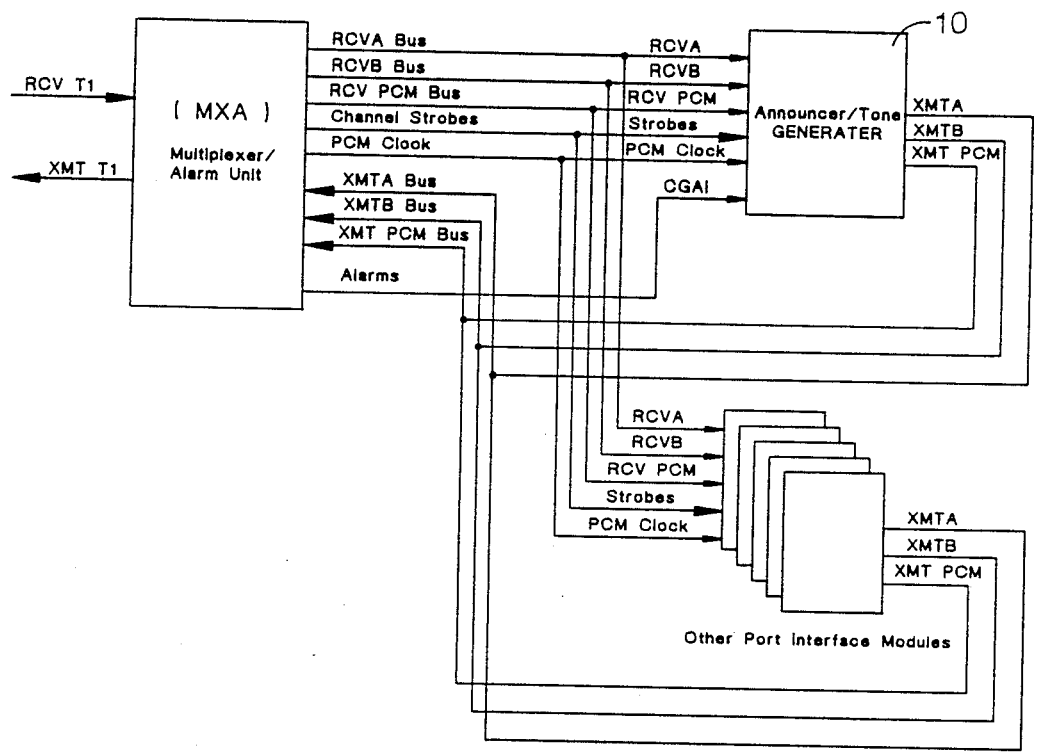
FIG. 2 is a schematic functional block diagram of the announcement and tone code generator of FIG. 1 as used in a typical application of interfacing on a bus through a time division multiplexer along with other port interface modules.
Figure 3A:
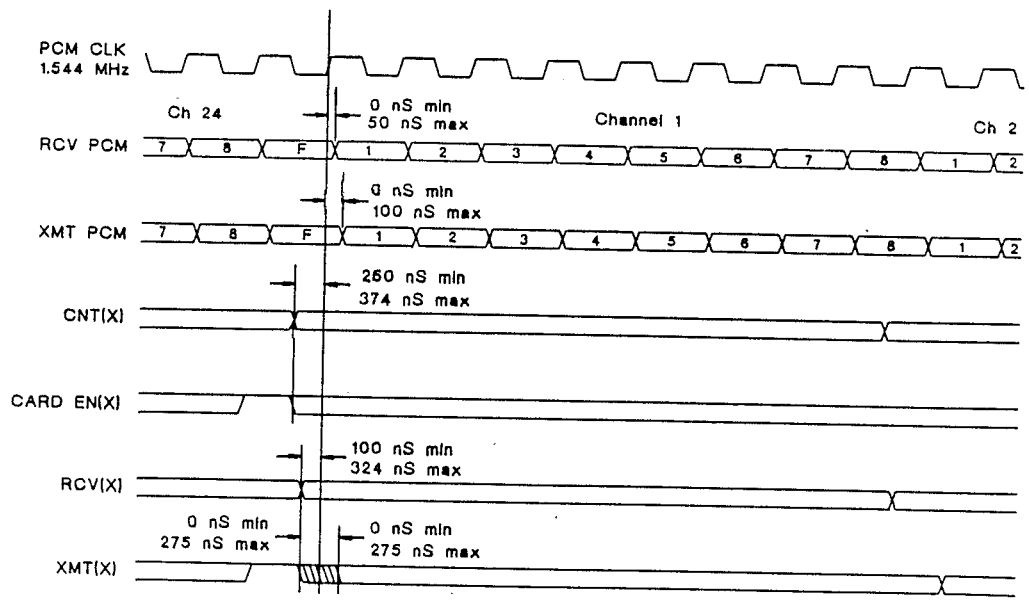
FIG. 3A is a set of comparative waveforms of the PCM, signalling and strobe timing signals produced on various outputs of the circuit of FIG. 2.

Referring to FIG. 2, when strapped for a precise tone or test tone, the generator 10 retrieves PCM encoded tone samples from its tone memory 16, and injects the samples into the appropriate time slot on the XMT PCM Bus. These tone functions use no external signalling, so that a card that uses only the tone plant functions will be compatible with either standard or special B channel signalling protocols. When active, however, the generator asserts the XMTA and XMTB buses, or signalling highways, low to indicate an in-service condition.

The DTMF Sender function, FIG. 4C, uses the special B channel signalling highway to accept "character" information that describes a DTMF (Dual Tone Multi-Frequency) signal. The character information is then processed by the generator 10 to produce the corresponding PCM encoded DTMF signal, which is injected into the appropriate time slot on the XMT PCM Bus. FIG. 4C shows the keypad digit, the B channel signalling character, and the output frequencies for each of the DTMF signals. The duration of each DTMF signal is to be 50 ms followed by 50 ms (minimum) of inter-digit quiet. Since the B channel character transfer rate is one every 43.5 ms, a 1k-byte character buffer is used to ensure maximum throughput.

The MF (Multi-Frequency) Sender function operates in much the same way as the DTMF Sender, except the codes and frequencies shown in FIG. 4D are used. The duration of each MF signal is 70 ms with the exception of the 'Digit String Begin' signal which lasts 100 ms. The minimum inter-digit quiet interval is 70 ms.

In addition to the tone functions described above, generator 10 also allows the selection of programmable digital announcements by preferably utilizing the two megabytes (actually 2,097,152 bytes) of battery-backed CMOS Dynamic RAM for volatile memory 14. A direct PCM storage format is used, so that a maximum total message length of approximately 262 seconds (about 4.4 minutes) is available to the four channels.

The maximum message length for each channel is allocated in 2, 8, 16, 33, and 33 to 262 second blocks, depending on the position of the function selection switches. The variable maximum length can be calculated by subtracting the total of fixed length blocks from the total on the assembly, and dividing by the number of channels selected for variable maximum message length. For example, if the four channels were strapped for 2, 16, and 2 @ 33 to 262 sec announcements, the two variable message lengths are computed to be 122 seconds maximum.

Another example might use one channel for busy tone and the other three for 8, 33, and 33 to 262 second announcements. The maximum variable length announcement would then be 221 seconds.

A "Type Playback" option allows each of the announcements to start playback either by signalling or continuous loop (which will cycle indefinitely once a valid message is recorded), as shown in FIG. 4B. In keeping with one aspect of the invention, a battery back-up circuit 30 allows the recorded announcements to be saved in case of power failure. When fully charged, the 9 volt nickel-cadmium (NiCd) battery can retain memory for a minimum of six continuous hours The expected battery life is 300–400 charge/discharge cycles or 5–6 years standby on a steady 1 mA trickle-charge.

Preferably, the generator provides various controls and strapping options. A four position berg pin strapping option for announcer signalling allows the generator 10 to be compatible with either standard or special B (default) channel signalling protocol. Two spare positions are provided for future expansion. The ten position dip switches (five positions designated to each channel) 21, FIG. 1, are provided for function selection. The switch designations are described below:

| | |
|---|---|
| Channel 1 | Switch 1, positions 1–5 |
| Channel 2 | Switch 1, positions 6–10 |
| Channel 3 | Switch 2, positions 1–5 |
| Channel 4 | Switch 2, positions 6–10 |

Figure 7:
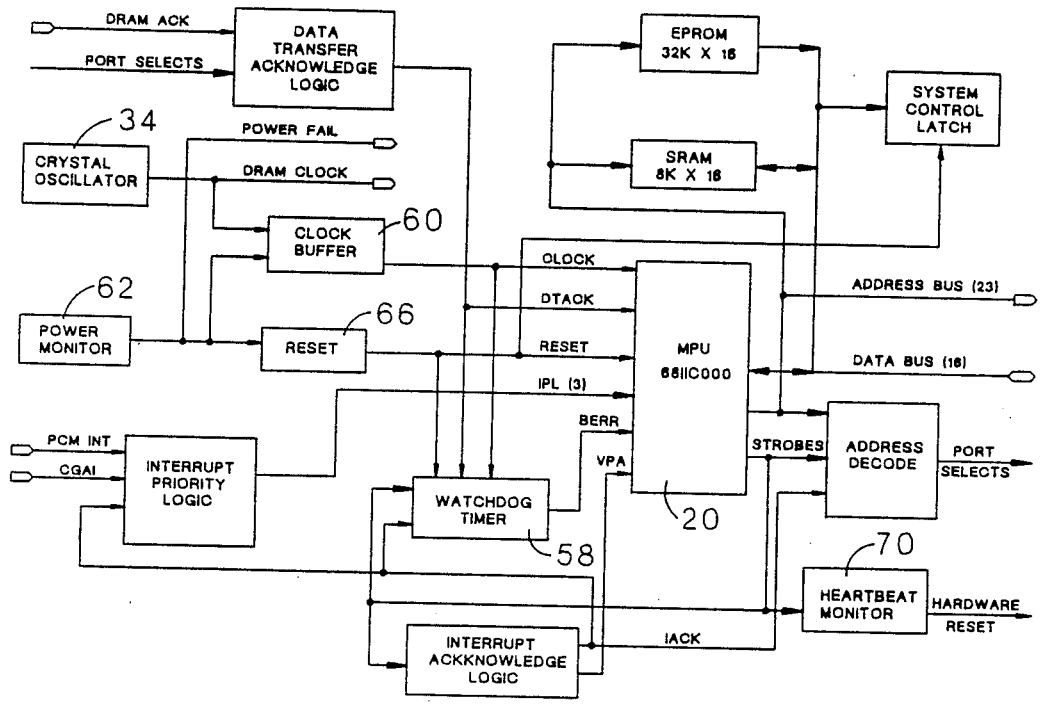
FIG. 7 is a functional block diagram of the central processing unit or CPU portion of the announcement and tone code generator block of FIG. 2.
Figure 8:
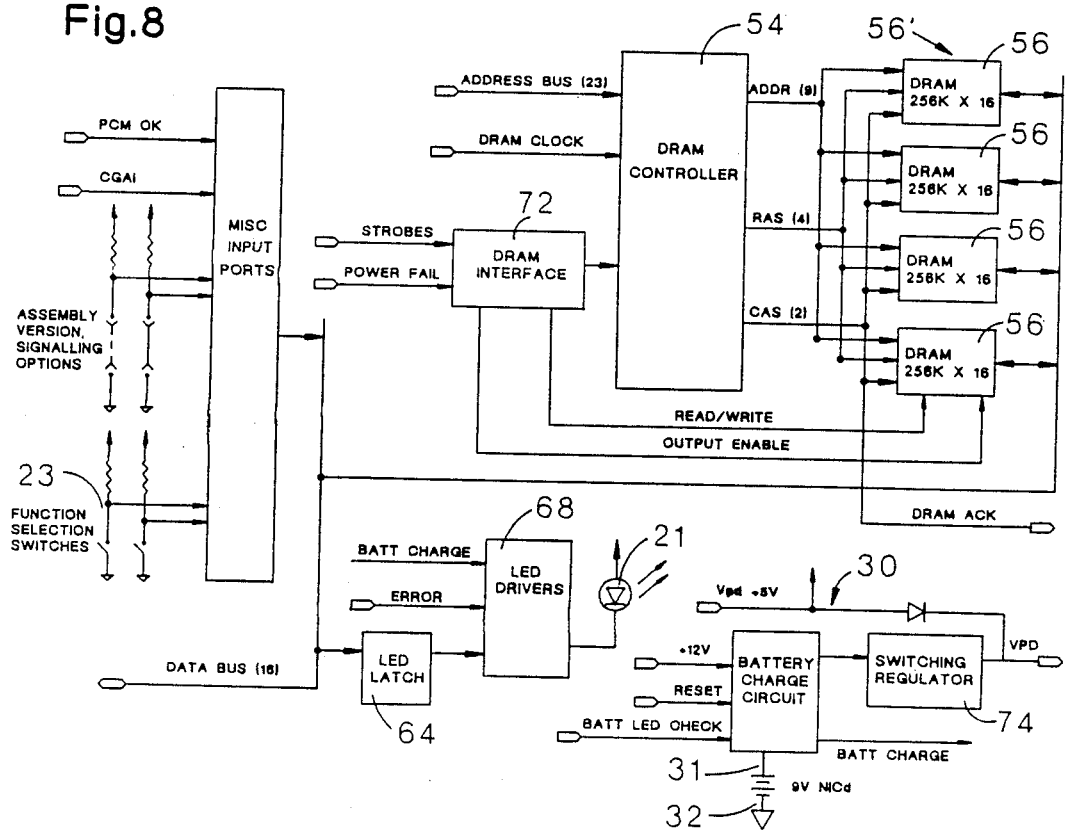
FIG. 8 is a functional block diagram of the DRAM, miscellaneous input/output ports and battery back-up portions of the announcement/tone code generator of FIG. 2.

A two position switch 31 allows the generator 10 to be stored or stocked without draining the on-board 9 volt battery 32, FIG. 8. The disable position creates an open circuit at the positive terminal of the battery 32, while the enable position connects the battery 32 to the backup circuit. The switch can be activated from the front of the generator 10 after installation. For testing purposes, a berg pin strap is provided on the output of a crystal oscillator 34, FIG. 7, which allows an external clock to be injected into the generator 10. This strap must be in place for normal operation.

Figure 6:
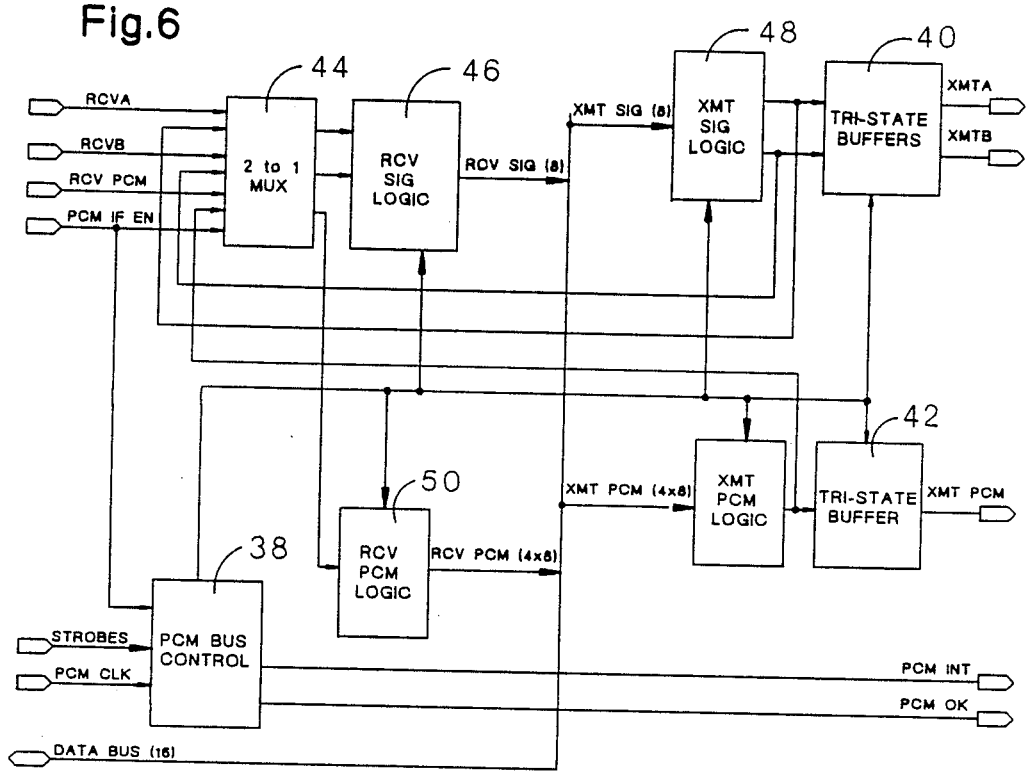
FIG. 6 is a functional block diagram of the PCM interface portion of the announcement/tone code generator block of FIG. 2.

There are several LED indicators, or LED's, 21, FIGS. 1 and 8, on the generator 10 that are visible from the front of the unit. Only one is shown, but the rest will be discussed. Each channel of the generator 10 has a yellow Channel Active LED that indicates when the PCM encoded output XMT PCM or input RCV PCM, FIG. 6, is active. The Channel Active LED's 21 are also used to display encoded error messages when in a diagnostic mode which will be described below Each channel of the generator 10 also has a green Valid Message LED 21 that indicates a valid message has been recorded onto an announcer channel. The Valid Message LED's 21 are also used to display encoded error messages when in diagnostic mode. A single Error LED indicates that one of a set of diagnostic or operational errors has occurred. The error type is encoded on the Channel Active LED's while the Error LED 21 is flashing. The Error LED 21 is also used as an overload indicator when recording an announcement. If the incoming PCM i greater than −9 dBm in magnitude, the waveform is clipped and the Error LED 21 is turned on. The Error LED 21 is turned off once the level falls below −9 dBm. A battery charge LED 21 indicates that the battery is enabled, and is being charged at a 0.1C rate (10% of total capacity or 10 mA). Charging to full capacity (10.15 volts) should take not more than 14 hours, at which time the battery charge LED will go out and a slower trickle-charge (1 mA) circuit is enabled.

Prior to installation, the function selection switches 23 must be positioned to the desired function, the signalling strap must be correctly positioned (default Special B), and an Xtal Enable strap must be in place. The battery enable switch 31, however, should be asserted after installation. When the generator 10 is installed, a series of diagnostics will be executed which are concluded by a visual LED test. It should be noted that these diagnostics can take a relatively long time (>30 seconds), especially if valid messages are present. The generator 10 is then operated according to the function selected.

On boot-up, the generator 10 executes a series of power-on diagnostics, which help ensure the integrity of both the hardware and firmware. The progress of the diagnostics can be monitored through the Channel Active LED's 21, which act as a binary counter that is incremented each time a new test is started. If a diagnostic is not passed, the Error LED 21 flashes, showing the binary encoded error on the Channel active LED's 21.

In addition, to the following diagnostic tests, some processor exception error codes are included that may help in hardware debugging. Error codes are preferably provided for EPROM check sum error, processor register test error, static RAM write/read error, PCM bus interface error, signalling bus interface error, dynamic RAM write/read error, microprocessor bus error (BERR), MPU address error, MPU illegal instruction error, MPU divide by zero and MPU spurious interrupt error. An EPROM checksum test adds all the higher and lower order bytes of program memory (hex locations 000000H to 00FFFBH) and compares the result to two predetermined 16 bit checksums stored at 00FFFCH to 00FFFFH. A processor register test writes alternating bit patterns to the various microprocessor registers and then compares the result to the original value. The bit pattern is then inverted and the test repeated. All registers are then cleared to complete the test. A static RAM write/read test writes various bit patterns to static RAM (hex locations FF8000H to FFBFFFH) and then compares the result to the original values. The bit patterns are then inverted and the test repeated. All SRAM locations are cleared to complete the test. A bus interface turn-around test is performed; The interface to the PCM bus is checked by disabling the data signals from the bus and using the PCM strobes to loop the transmit data back to the receive side, where it can be read and compared to the output. If the PCM channel strobes are not present, the diagnostic will time out and an error is generated. This condition occurs most frequently when the generator is plugged into a slot in which the corresponding MXA is not present.

Start up diagnostics also includes a dynamic RAM write/read test. Before writing any data to the DRAM banks, valid messages must be identified so they are not corrupted. This is done by computing the starting address of each announcement and checking for the valid message code. This code is written to the first four bytes of allocated dram upon completion of recording a valid message. So, if a "warm-start" (power on clear with valid messages) occurs, a special DRAM test will be executed. If a "cold-start" (power on clear with no valid messages) occurs, various bit patterns are written to the DRAM locations (400000H to 5FFFFFH) and compared to the original values. The bit patterns are then inverted and the test repeated. If any errors are detected, the tests are magnified to identify failures at the chip level. Any chip failures in the valid message LED's along with the error LED. A DRAM chip reference designator is associated with the particular DRAM error code. If no errors are detected, all DRAM bits are set to 1's and the test is completed.

If valid messages are present, the valid PCM voice samples are copied to the processor, inverted twice, and compared to the original value. This allows the entire block of DRAM to be tested while saving all valid messages. When message blocks are being tested, the appropriate valid message LED is turned on until that block is complete. If any errors are detected, a branch is taken on the "cold start" DRAM test routine.

After all of the above tests are successfully completed, all of the LED's 21 are turned on for approximately 0.5 seconds.

If a channel is selected for a tone function, the A and B signalling highways are pulled low (to indicate in-service), PCM is injected into the appropriate time slot, and the channel active LED 21 is turned on. If the tone has some cadence (i.e., ringback tone), the channel active LED is turned off during pauses.

The announcer function has the capability to operate in either the standard or a special B signalling environment. The special B option, however, is not intended for system level use, but for functional testing purposes only FIGS. 3A–3D show the signalling interfaces required to operate the announcement function in the standard signalling protocol environment. When in an idle state, receipt of the sequence shown in FIG. 3A will cause the generator 10 to enter a record mode. The generator 10 acknowledges the record command by returning an in-use state (XMTA=0, XMTB=1) and turning on the channel active LED 21. The recording process entails erasing any previous valid message code, reading the input sample, limiting it to −9 dBm, and storing the sample appropriately in DRAM 14. The generator continues recording until RCVA=0 or until the generator runs out of allocated memory. In either case, the generator 10 enters the rewind state (XMTA=1, XMTB=1), and turns off the channel active LED 21. After RCVA goes to zero, the valid message code is written to the first four bytes of allocated DRAM and an end of message pointer is written to the next four. The valid message LED is then turned on and, after the rewind times out, the generator returns to the idle state.

When in idle state and a valid message is present, receipt of RCVA=1 for 280 mS (FIG. 3B) will cause the generator 10 to enter the playback mode. The signalled playback process entails checking valid message code integrity and retrieving the end of message pointer from DRAM before proceeding. If no valid message code exists, the command is ignored and the generator 10 returns to the idle state. The generator acknowledges the playback command by returning an in-use state (XMTA=1, XMTB=1) and turning on the channel active LED 21. The generator then retrieves PCM samples from DRAM and injects them onto the XMT PCM bus. When the end of message is reached, the generator enters the rewind state (XMTA=1, XMTB=1), and turns off the channel active LED. After the rewind times out, the generator returns to the idle state.

The loop playback option (FIG. 3C) utilizes the same process described above, except that after a rewind state occurs (from record or signalled playback), a one second timer is initiated, after which the loop playback mode is entered. The loop playback mode uses the in-service state (XMTA=0, XMTB=0), and turns on the channel active LED 21. When the end of message is reached, the beginning of message address is reloaded immediately, and continues playing indefinitely. Recording or signalled playback can be invoked at any time during this mode.

In some instances, it may be necessary or desirable to reset the generator 10. As an alternative to reseating the card, a remote reset feature is included, so that a "warm start" can be initiated by satisfying the requirement shown in FIG. 3D. This feature can be implemented from any state, mode, or function, as long as the generator 10 is strapped for standard signalling.

Though not intended for use at the system level, the generator 10 has the capability to use special B channel signalling to record and playback announcements. This mode of operation is useful for functional testing purposes. The hardware used for special B channel signalling to record and playback announcements for functional testing purpose is essentially an isolated port interface shelf with two MXA's linked back-to-back. A generator is installed with a digital supervisor console installed in the corresponding channel of the opposing digroup. Recording can be done by pressing a dictate (DIC) button on the console (not shown) and speaking into the handset microphone. Terminating the recording can be done by pressing a check (CHK) button. If in loop playback mode, the generator 10 will then cycle through the playback indefinitely. If in signalled playback mode, the check button needs to be pressed again to initiate playback of the recording.

FIG. 2 shows a typical application of the generator within the port interface structure, and FIGS. 3 and 4 show the timing associated with the PCM Bus interface.

The microprocessor 20 uses a 68HC000 made by Motorola which supports several levels of prioritized interrupts, but only two are used. These interrupts are derived from external signals. A level 7 non-maskable interrupt utilizes the external carrier group alarm immediate (CGAI) signal to tri-state all outputs until the alarm is cleared. The generator then executes the reset routines as if power had just been applied. A level 6 interrupt is used to synchronize the PCM bus to the CPU. This is done by using the PCT Strobes, or Strobes, FIGS. 2 and 8, and the PCM Clock, FIG. 6, to generate the interrupt every 125 uS, which signals the processor that the PCM interface circuitry is idle, and can be assessed.

Figure 5:
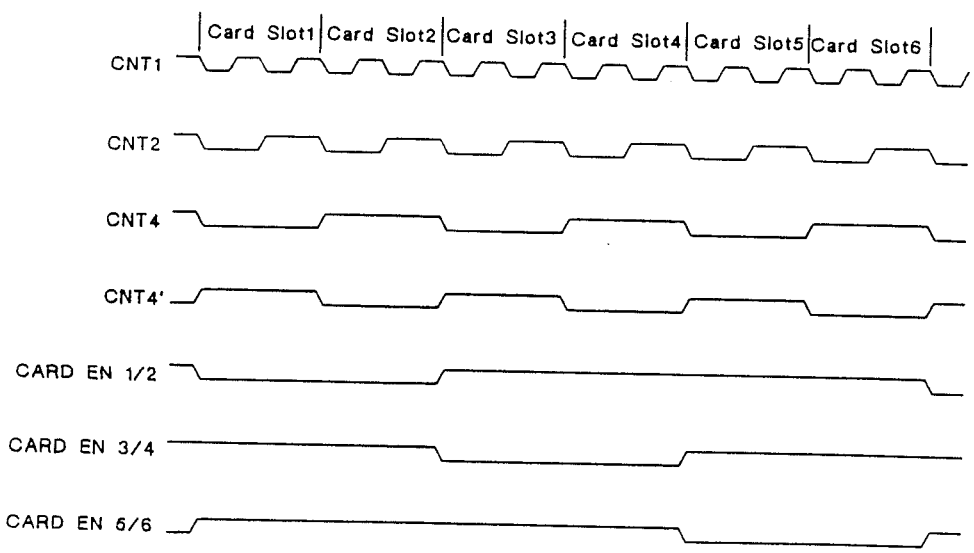
FIG. 5 shows waveforms illustrating the strobe sequencing for the multichannel, time division multiplexing performed by the multiplexer of FIG. 2.

The block diagrams of the PCM bus interface, the central processing unit 20, and the dynamic memory complex 14 are respectively shown in FIGS. 6, 7 and 8. The PCM interface provides the necessary circuitry to interface the microprocessor based CPU to the serial time division multiplexed PCM bus defined by FIGS. 3A and 5. The multiplexer 44 selects the signal path of the signalling highways and the PCM audio. The control line PCM IF EN (PCM interface enable) determines whether the input will be external or looped back from the output circuits. The loop-back feature is used during power-on diagnostics. The receive signalling logic 46 contains a dual 4 bit shift register, clock divider, and octal flip-flop, which convert the serial time division multiplexed (TDM) signalling highways to a microprocessor (MPU) compatable parallel input port. The Xmt signalling logic 48 contains an octal FF and a dual 4 to 1 mux, which convert a MPU output port to the serial TDM Xmt signalling highways. The PCM bus control 38 processes the channel strobes and PCM clock to generate timing for the Rcv/Xmt PCM/Signalling blocks, and to generate the 125 uS interrupt that is used to synchronize the CPU to the PCM Bus. The Rcv PCM Logic 50 contains four 8 bit serial-in-parallel-out (SIPO) shift registers with latches, which convert the TDM PCM audio to MPU compatable parallel input ports.

The transmit PCM logic contains four 8 bit parallel-in-serial-out (PISO) shift registers with latches, which convert MPU 20 output ports to TDM PCM audio. Under direction of the PCM bus control 38, FIG. 6, the tri-state buffers 40 and 42 inject PCM audio and signalling in the appropriate time slot of the transmit PCM and signalling highways XMTA and XMTB. When PCM IF EN line, FIG. 6, is not active, however, all bus interface is at high impedance.

The processing section provides the usual elements necessary for general microcomputing. The MPU 20 preferably comprises 68HC000 (CMOS 68000) made by Motorola. The eraseable programmable read only memories use two 27 C256 EPROM's made by many vendors, (32K×8), yielding a 32K×16 array. These EPROM's are used for both program and data (approximately 16K bytes are used for tone look-up tables). Two 8K×8 CMOS static RAM's are provided for use as the system stack, scratchpad, FIFO character buffers, and temporary register files. These RAM's can also be used to execute relocatable code with zero wait states. The address decoder uses the address bus and strobes to identify various physical ports as numerical addresses. The address decoder also generates the appropriate handshaking signals to support asynchronous system operation. The data transfer acknowledge (DTACK) logic 52, FIG. 7, processes the handshaking signals generated by the address decoder and DRAM controller 54, FIG. 8, to let the MPU know that valid data can be transferred through the bus structure. Typically, one wait state (extra clock cycle) is needed when accessing DRAM 56, FIG. 8, but it may be increased to two or three wait states if an attempt is made to access DRAM 56 when concurrently executing a refresh cycle. In a asynchronous system, the MPU 20 waits for an external device to respond to an address signal before proceeding with the bus cycle. The watchdog timer circuit 58, FIG. 7, monitors the MPU bus cycle and generates a bus error (BERR) when the system is "hung up" by a non-responding device. The Interrupt Priority section encodes various interrupts to one of sevel prioritized levels. In this case, only two levels are used: Level 7 (Non-Maskable Interrupt) is assigned to carrier group alarm immediate (CGAI); and Level 6 is assigned to PCM synchronization interrupt. The Interrupt Acknowledge circuit uses the MPU 20 status outputs and strobes to generate the interrupt acknowledge (IACK) and valid peripheral address (VPA) signals. IACK signals the system that the MPU 20 is entering exception processing, and VPA signals the MPU that auto-vector (fixed in EPROM) interrupt processing will be used The output from crystal oscillator 34 is a CMOS level square wave @ 8 MHz±0.01%. It utilizes the battery back-up circuitry 30 for use in the power-down mode. The clock buffer circuit 50, FIG. 7, uses the output of the power monitor to mask off the main clock when power is lost. The DRAM clock, FIG. 8, however, remains functional through the battery back-up circuit 30.

A Power Monitor 62 monitors +5 volt main power and outputs an active lower power fail signal to indicate Vcc<4.5 volts. Hysteresis of approximately 100 mV is used to prevent oscillation due to power supply noise. The power fail signal from power monitor 62, FIG. 7, is used to: (a) initiate system reset, (b) mask off CPU clock to ensure interface of active to inactive devices (when in power down) is logic zero, (c) terminate any incomplete DRAM accesses, and (d) inhibit any involuntary DRAM accesses caused by power on/off transients.

The reset circuit uses the power fail signal to generate a system reset, which remains low more than 300 mS after power fail becomes inactive. In addition to the MPU 20, the reset signal affects the watchdog timer 58, the system control latch, and the LED latch 64. The System Control Latch serves as a general system control register, which is cleared on system reset. There are various control bits. A PCM interface enable tri-states XMT PCM/SIG buffers 40 and 42 and asserts loop-back when low and enables interface to PCM bus when active (high). A PCM interrupt enable allows usage of PCM interrupt by lifting the clear from the interrupt priority logic 66, FIG. 7. A DRAM reset causes an active high to reset the DRAM controller 54 refresh counter. This may corrupt data if asserted when a valid message is present. One of plural LED drivers 68, FIG. 8, lights the error LED 21. A battery LED check lights the battery charge LED for visual diagnostics.

A heartbeat monitor 70 utilizes the MPU address strobe to determine the living status of the system. If no processor activity is detected in a 4 millisecond interval, a hardware reset signal is generated in an attempt to revive the CPU. The reset process tri-states the transmit PCM and signalling, so that the generator 10 is taken out of service.

There are two input ports from which the controls and strapping options can be read. In addition to standard/special B channel signalling and function selection, the information can also be extracted from these input ports. A PCM OK bit, FIG. 8, allows the program to synchronize to the PCM bus by polling, rather than interruption. It is used by the PCM bus turn-around diagnostic. After the processor is interrupted by the carrier group alarm immediate, a CGAI bit is monitored until the alarm is cleared, at which time the program jumps to start. Generally, the LED information is latched from the MPU data bus and passed on to LED drivers 68. The battery charge data, however, is derived from the battery back-up circuit 30. A dynamic memory complex 56', FIG. 8, provides the generator 10 with the means to efficiently store voice data at a relatively low cost per megabit. DRAM interface circuits 72 provide additional timing and control necessary to interface the DRAM controller 54 and DRAM banks 56' to the CPU. The DRAM controller 54 provides the address multiplexing, timing, control, and refresh/access arbitration functions necessary to interface DRAM's to the MPU 20. The controller contains an 18 bit address multiplexer that generates a 9 bit address and the strobes required by the memory to decode the address. The other two address bits select one to four DRAM banks. The 9 bit refresh counter/timer generates 512 row addresses which are necessary to refresh the dynamic memories and ensure data retention. The controller also contains refresh/access arbitration circuitry which resolves conflicts between access requests and refresh cycles. The DRAM array for the generator is organized in four banks of 256K×16 (two megabytes). The chips used are one megabit density configured in a 256K×4 array.

In keeping with one aspect of the present invention, the battery back-up enables the generator 10 to retain valid messages in DRAM 56' by keeping the DRAM refresh circuitry powered by battery 32 when main system power fails. This is done by generating an auxiliary, uninterruptible +5 volt power supply (Vpd), FIG. 8. Vpd (power-down) is supplied only to the components that are necessary to operate the DRAM 56' and associated refresh circuits. These are the DRAM 56', itself, the controller 54, some interface circuitry, the clock oscillator 34 and the clock buffer 60. Vpd is derived form the system +12 volt supply or the +9 volt NiCd battery, whichever is greater. This is inputted to a step-down switching regulator 74, which operates at greater than 80% efficiency, to produce Vpd (+5VDC±5%). When the +12 volt supply is active, a charging circuit keeps the battery charged to full capacity (100 mA-hr), and when +12 volt power is lost, approximately 13 mA is drawn from the battery, yielding over seven hours data retention. Some protection circuitry is incorporated so that if the switching regulator latches up (a short from +12 VDC to Vpd), five watt zener diode will absorb the excess power until the 250 mA fuse blows, disabling both the 12 volts and battery. A schottky barrier across Vcc, however, allows continued operation (until +5 VDC power is lost).

Referring now to FIGS. 9A-9Q, the program memory 22 contains a computer program to achieve the various functions of the invention as described above. The listing of the program is attached in Appendix A. These are flow charts for the preferred computer programs stored in the program memory of the microprocessor unit of the announcement and tone generator of FIG. 1 and as reproduced in the printed computer program listing of Appendix A attached to the back of this application.

In FIG. 9A, the EPROM Checksum Test adds all the odd and even bytes of EPROM and compares each least significant 16-bits to a predetermined 16-bit checksum. If the sums do not match, a branch is taken to the error routine. The Processor Register Test writes and compares alternating bit patterns (0101..., 1010...) to each of the processor registers. If the results do not match, a branch is taken to the error routine.

Referring to FIG. 9B, the Static RAM Test writes and compares alternating bit patterns (0101..., 1010...) to each of the static RAM locations. If the results do not match, a branch is taken to the error routine. The PCM Loop Test writes and compares alternating bit patterns (0101..., 1010...) to each of the PCM I/0 ports while in local loopback mode. If the results do not match, a branch is taken to the error routine.

The Signalling Loop Test in FIG. 9C writes and compares alternating bit patterns (0101..., 1010...) to the signalling I/0 ports while in local loopback mode. If the results do not match, a branch is taken to the error routine. The Function Selection switches 23 are then read and a function vector is generated based on the binary position of the switches. This is used later for subroutine address calculation. The assembly level is then checked hard-wired binary code) to determine the amount of dynamic RAM present on the assembly.

The DRAM Allocation Routine of FIG. 9D calculates the starting and ending DRAM addresses of each of the announcement channels, based on the positions of the function selection 23 switches. This allows various maximum length configurations while utilizing all available memory. The Function Vector is then used to generate a subroutine address and set up all the parameters and operations particular to that channel function. The assembly level is checked again to bypass the DRAM Test if no DRAM is present.

Figures 9E, 9F:
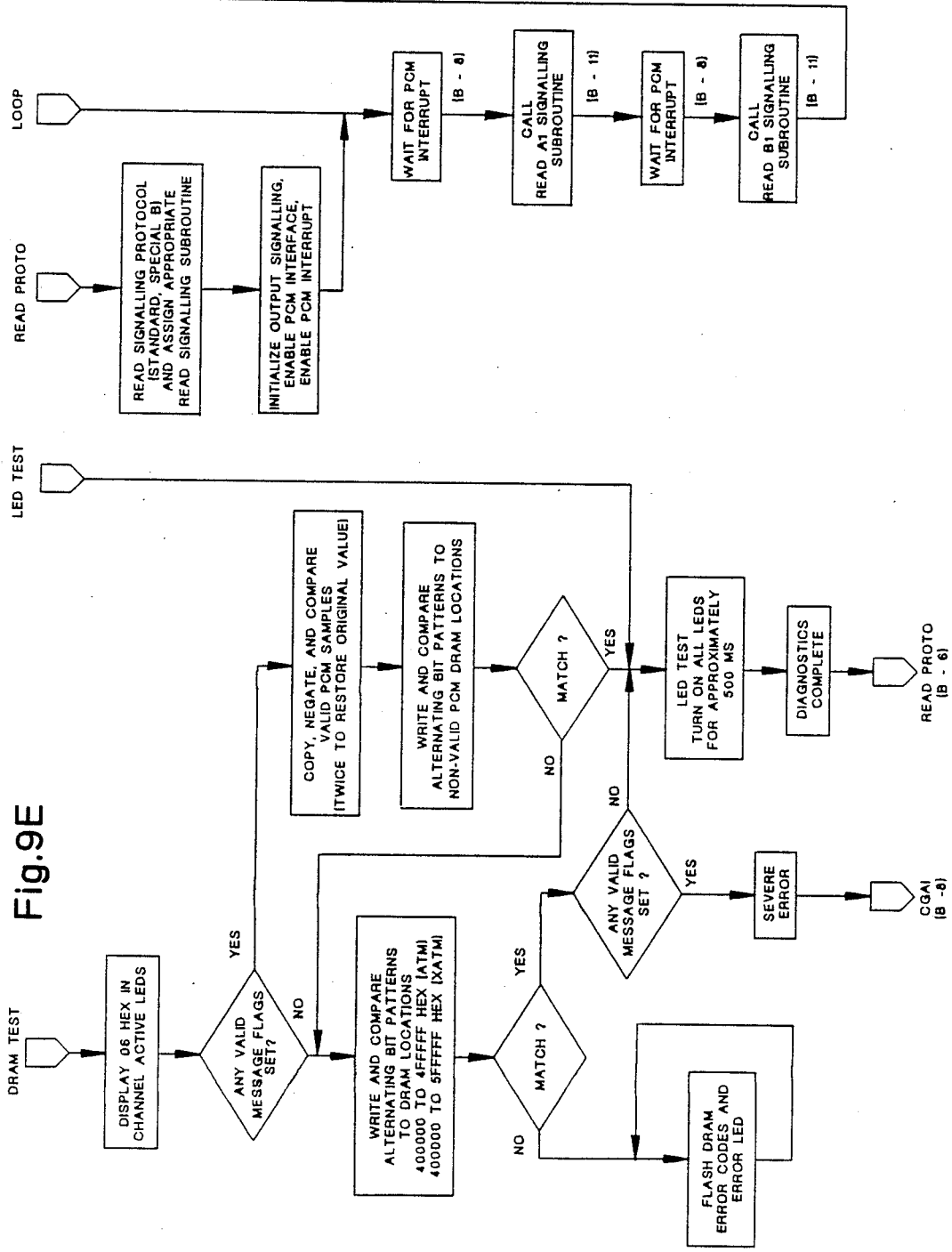
FIGS. 9A, B, C, D, E, F, G, H, I, J, K, L, M, N, 0 and P are flow charts for the preferred computer programs stored in the program memory of the microprocessor unit of the announcement and tone generator of FIG. 1 and as reproduced in the printed computer program listing of Appendix A attached to the back of this application.

Referring to FIG. 9E, since the DRAM is battery backed, valid messages may be present in DRAM, so testing is done very carefully so that no messages are corrupted. This is done by writing and comparing alternating bit patterns (0101..., 1010...) to DRAM locations not containing valid PCM, while negating and comparing (twice) the locations that do contain valid PCM samples. If any failures are detected, the device error code is flashed on the LED's 21. The LED's 21 are then turned on for 500 ms signifying that all diagnostics have been successively completed.

The Read Signalling Protocol Routine of FIG. 9F and FIG. 9G assigns the signalling processing based on the position of the strap option. The two options available are standard and "special B". The Real-Time Processing Loop is the primary functional routine of the software. It contains synchronization code necessary to interface to the external devices and process four channels of digital audio in real-time. The loop is constructed so that the signalling I/0 is processed every 12 PCM frames. Once the signalling is updated, the loop starts over.

Referring to FIG. 9H, the PCM Interrupt is serviced during the real-time loop and is used for synchronization to the external PCM highway. This routine uses the Function Vector to call a specific PCM subroutine process, which essentially moves a PCM sample from one point in memory to another and incrementing the memory pointer. The Carrier Group Alarm Interrupt indicates a system level problem and generally, waits for the alarm to be cleared before starting from the diagnostics.

At any time during processing, a hardware/software failure may cause an error condition to occur at the microprocessor as defined by the exception vectors. These "exceptions" result in an external failure indication which is intended to aid in program debugging. The Error Routine of FIG. 9I is also branched to from a power-on diagnostic failure.

Figure 9J:
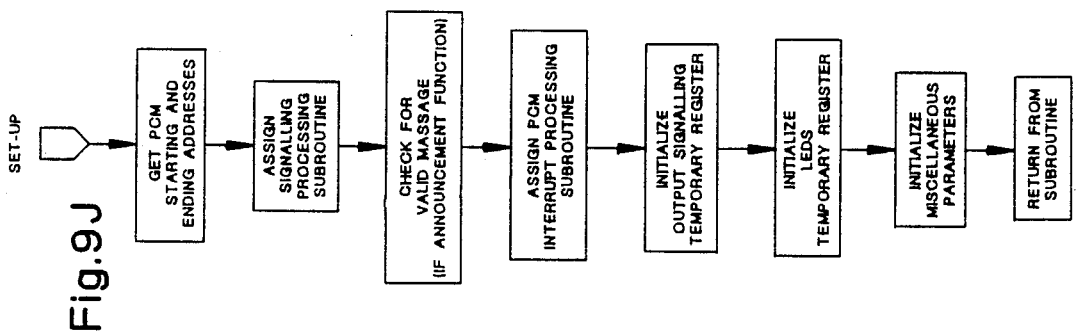
Figure 9I:
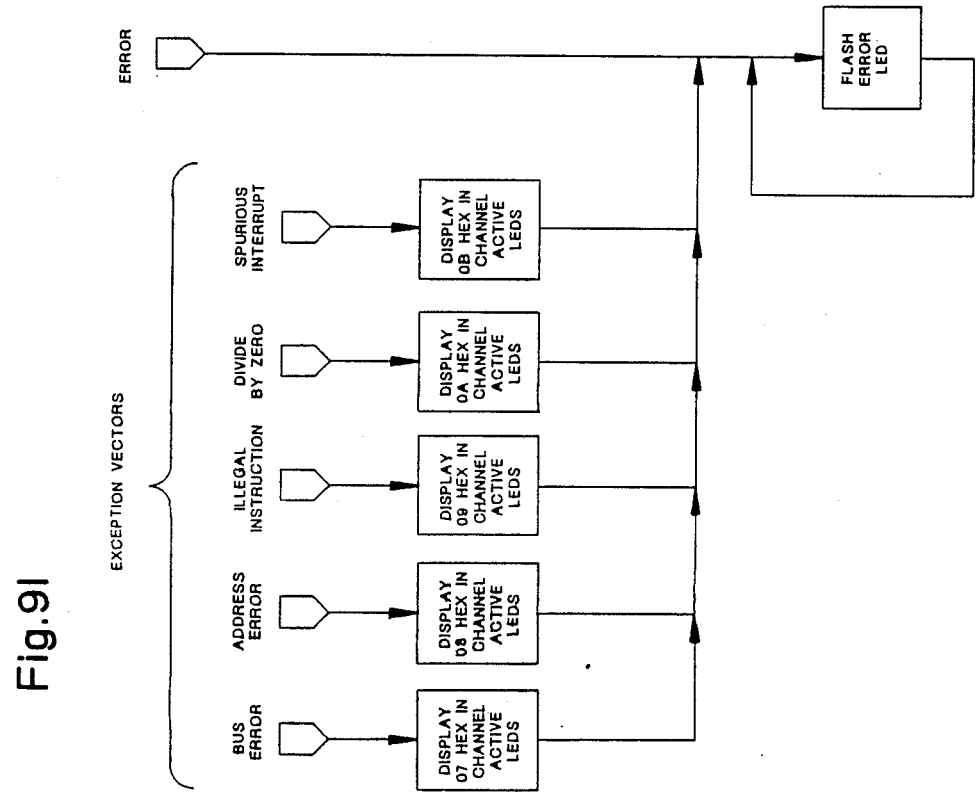

The Set-Up Subroutine initializes all parameters and subroutines needed for each of the separate functions for each of the channels, as shown in FIG. 9J.

For standard signalling, the Read Signalling Subroutine shown in FIG. 9K basically filters and stores the incoming signalling in a RAM location for later use. The Special B option accumulates a control byte from the input signalling bits, and stores the data byte in a RAM location for later use.

Figure 9L:
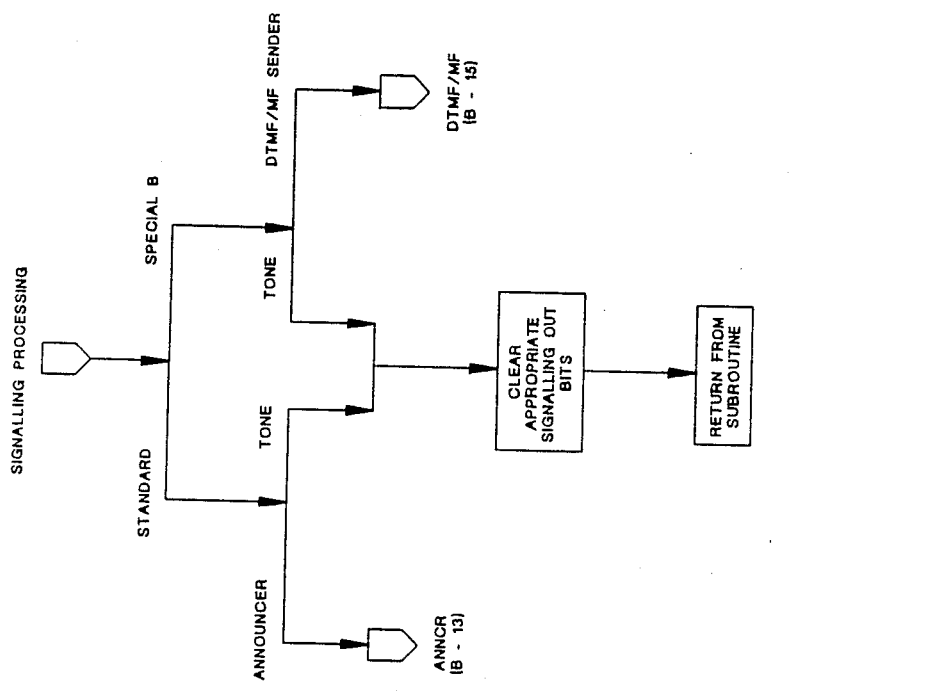
Figure 9K:
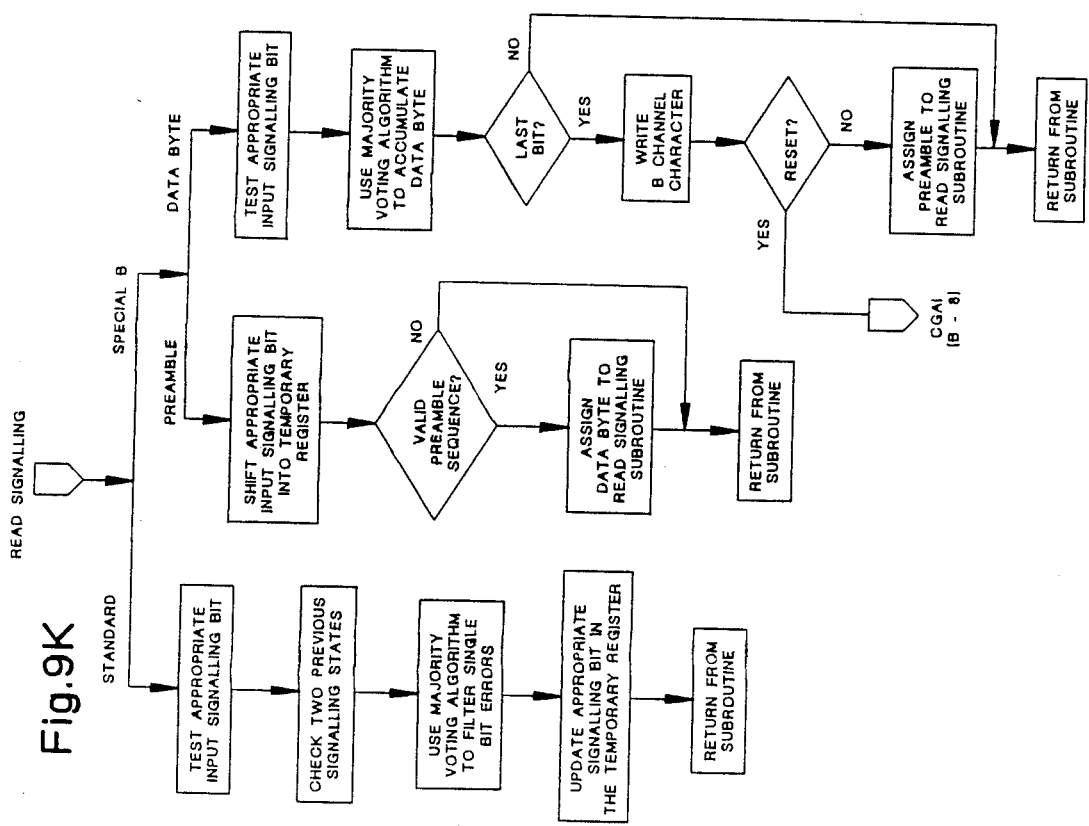

In FIG. 9L, the Signalling Processing Subroutines are a series of routines that are dependent on the signalling protocol and the function selected. At this time, if the Special B option is selected, the function must be either a fixed tone or DTMF/MF Sender. If standard signalling is selected, the function must be either a fixed tone or an announcer.

Figure 9P:
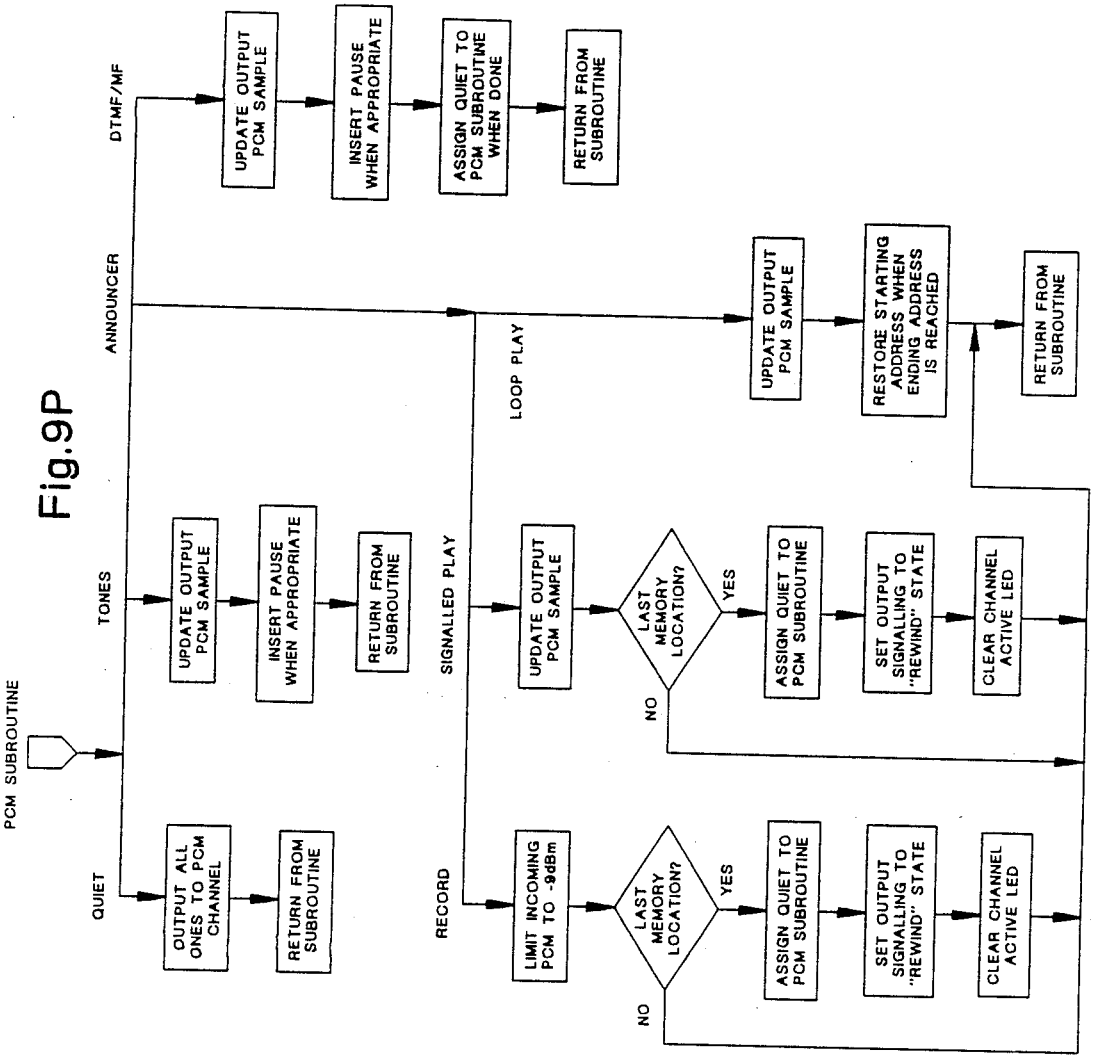
Figure 9O:
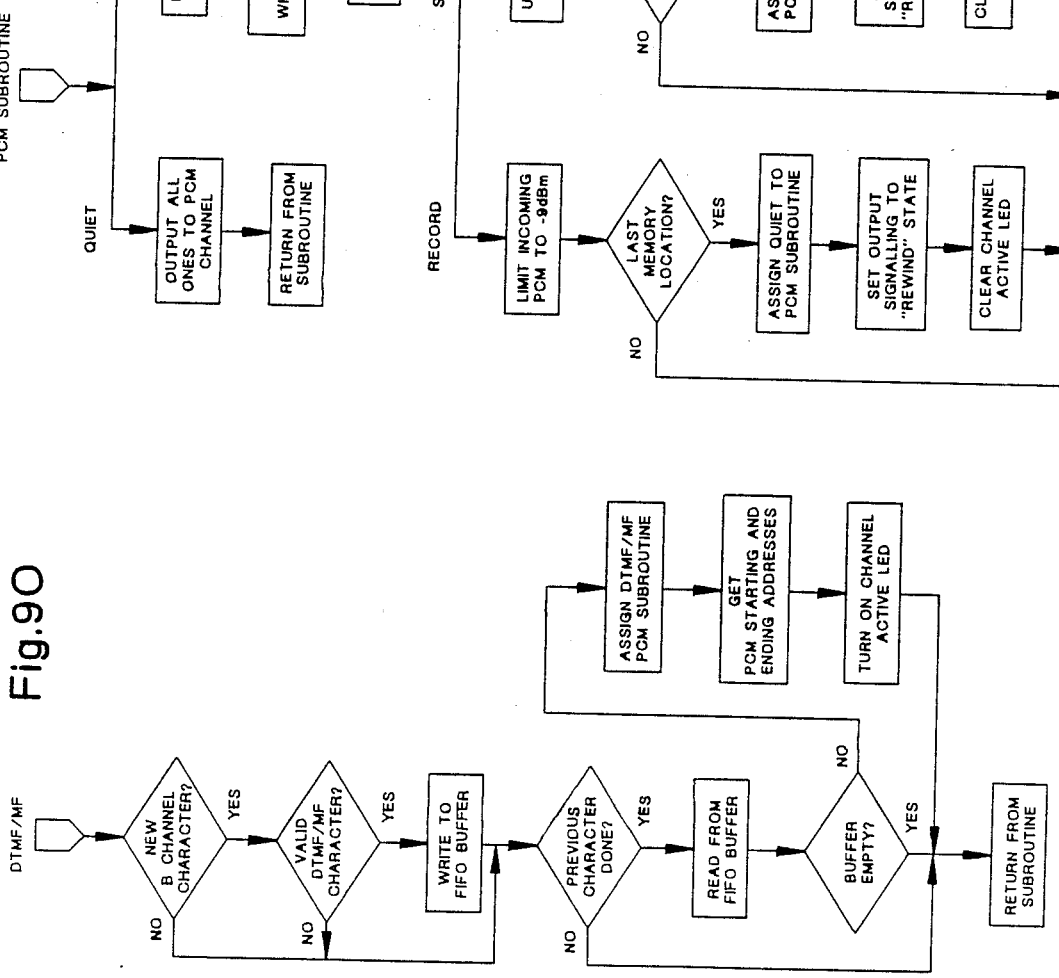
Figure 9N:
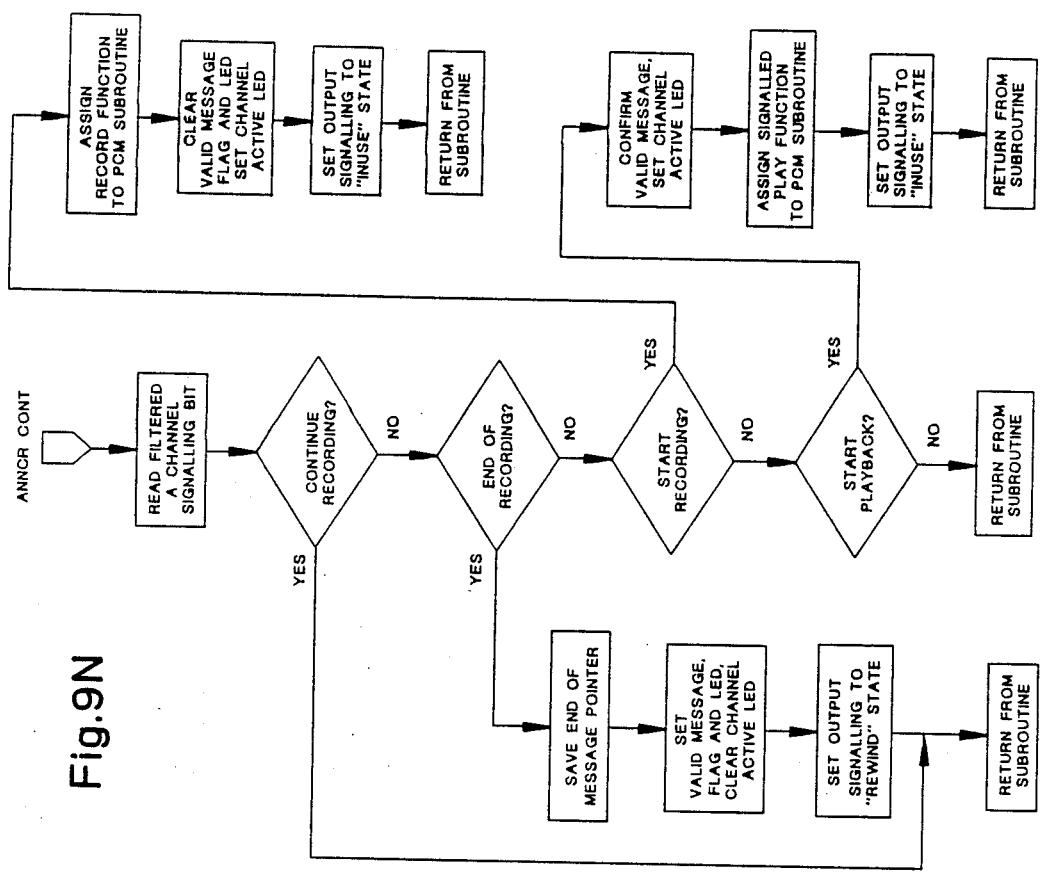
Figure 9M:
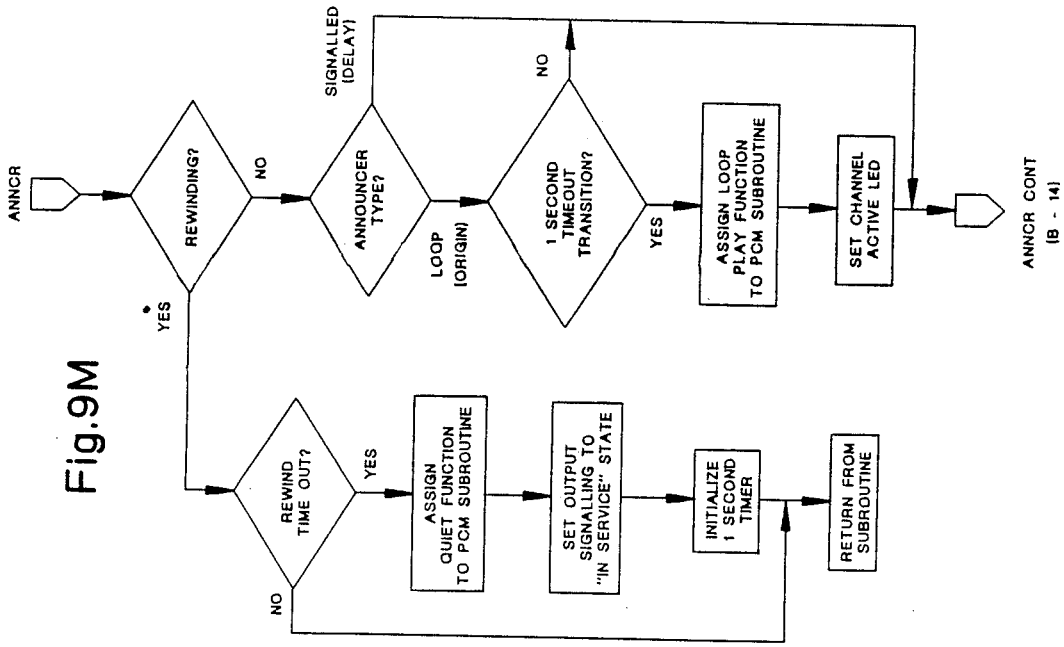

The announcer control processing subroutine of FIGS. 9M and 9N handles the control process of the announcer function. The signalling bits are interpreted as general tape recorder functions (i.e., Play, Record, Rewind). The announcer can also be configured as a loop play (playback cycles indefinitely once recorded), or signalled play (playback is initiated by signalling).

The DTMF/MF Sender Control Processing subroutine of FIG. 9O basically receives Special B channel bytes and uses the byte to assign a DTMF or MF tone pair generator subroutine to the PCM handler. A first-in-first-out buffer is used so that data bytes can be received faster than the tones are transmitted.

In FIG. 9P, the PCM Processing Subroutines are a series of routines that are assigned by the Signalling Processing Subroutines. These subroutines are responsible for the movement of PCM samples from one place to another, based on the function and current process.

While a particular embodiment has been disclosed in detail, it should be appreciated that many variations may be made without departing from the scope of the invention as set forth in the appended claims.

I claim:

1. An apparatus for generating both tone codes and announcement codes for connection with a telephonic switching system, comprising:
   a first memory for storing at least one PCM binarily encoded announcement;
   a second memory for storing at least one PCM binarily encoded tone;
   a single digital interface for coupling both the PCM binarily encoded announcements and the PCM binarily encoded tones to a telephonic switching system; and
   a controller including a microprocessor for selectively providing at least one PCM binarily encoded announcement and at least one PCM binarily encoded tone to said single digital interface.

2. The tones and announcements generating the apparatus of claim 1 in which
   at least one of the first and second memories is a volatile memory which only stores data while electrical power is provided thereto, and including
   a back-up circuit responsive to a loss of a regular source of electrical power to said at least one volatile memory to provide back-up battery power thereto.

3. The tones and announcements generating apparatus of claim 2 in which only said first memory is a volatile memory and said back-up circuit includes means for coupling back-up battery power to the first memory in the event of power loss.

4. The tones and announcements generating apparatus of claim 3 in which said volatile memory is a dynamic random access memory.

5. The tones and announcements generating apparatus of claim 3 in which said second memory is a nonvolatile memory.

6. The tones and announcements generating apparatus of claim 1 in which said second memory is a nonvolatile memory.

7. The tones and announcements generating apparatus of claim 6 in which
   said first memory is volatile memory, and including
   a back-up circuit to provide auxiliary power to said first memory.

8. The tones and announcements generating apparatus of claim 1 in which
   said digital interface has means to interface a plurality of channel output signals associated with a plurality of channels, and
   said controller microprocessor is programmed for selectively providing the binarily encoded announcement and the binarily encoded tones to said plurality of channels on a time division multiplex basis.

9. The tones and announcements generating apparatus of claim 1 in which
   said first and second memories have means for storing a plurality of tones and a plurality of announcements, respectively, and
   said controller microprocessor has means for preselecting any one of the plurality of tones and any one of the plurality of announcements to be provided during any preselected time division channel in response to receipt of a corresponding control signal at an input thereof.

10. The tones and announcements generating apparatus of claim 9 in which said preselecting means includes a multiposition switch for indicating different codes to the microprocessor representative of different tones and announcements for said different channels.

11. A method of generating both tones and announcements from digital electronic memories which are protected against memory loss due to loss of regular power, comprising the steps of:

storing the announcements in a volatile memory protected against memory loss due to loss of regular electrical power by means of a back-up battery circuit;

storing the tones in a nonvolatile memory that is not subject to loss of memory due to loss of electrical power; and selectively applying both said stored tones and announcements to a preselected output port on a time division multiplexing basis for coupling to different channels of a telephonic network.

12. The tone and announcement generating method of claim 11 in which said step of storing the announcements includes the step of storing said announcements in a binarily encoded form in a random access memory and said steps of selectively applying includes the step of successively applying binarily encoded segments of the stored binarily encoded announcement to said output port during the same one of an ordered plurality of time segments of successive frames of said plurality of segments.

13. The tone and announcement generating method of claim 11 in which said step of storing said tones includes the step of storing said tones in binarily encoded form in a nonvolatile electronic memory.

14. The tone and announcement generating method of claim 11 in which said step of selectively applying said stored tones and announcements includes the step of preselecting a tone or announcement for a given one of a plurality of channels and applying both tones and announcements to the same channel of a multichannel telephone network at different times in accordance with said preselection.

15. The tone and announcement generating method of claim 14 in which said step of preselecting includes the step of encoding the preselection by setting the portions of at least one multiposition switch.

16. The tone and announcement generating method of claim 11 in which said step of selectively applying includes the step of selectively applying said stored tones and stored announcements in binarily encoded form on a time division multiplex basis through means of a digital interface circuit.

* * * * *